United States Patent [19]

Eagen et al.

[11] Patent Number: 5,247,614

[45] Date of Patent: Sep. 21, 1993

[54] METHOD AND APPARATUS FOR DISTRIBUTED PROCESSING OF DISPLAY PANEL INFORMATION

[75] Inventors: Stephen T. Eagen; Harvey G. Kiel, both of Rochester; Nelson A. Martel, Jr., Stewartsville; William C. Rapp; Schuman M. Shao, both of Rochester, all of Minn.

[73] Assignee: International Business Machines Corporation, Armonk, N.Y.

[21] Appl. No.: 576,548

[22] Filed: Aug. 30, 1990

[51] Int. Cl.$^5$ .............................................. G06F 13/00
[52] U.S. Cl. ..................................... 395/200; 395/162
[58] Field of Search .................. 364/DIG. 1, DIG. 2; 395/200, 162, 155, 163, 800; 340/706, 726

[56] References Cited

U.S. PATENT DOCUMENTS

5,109,487  4/1992  Ohgomori et al. ............... 395/200

Primary Examiner—Robert L. Richardson
Attorney, Agent, or Firm—Curtis G. Rose; Steven W. Roth

[57] ABSTRACT

A method and apparatus for distributing the processing of certain remote terminal keystroke signals, and formatting of display panels according to user interface rules, to a workstation control interface in a system having a host processor connected to a large number of remote keyboard/display terminals through an intermediate workstation control interface.

9 Claims, 6 Drawing Sheets

Sample Entry Panel

Type choices, press Enter

| Item | Choice | Possible Choices |
|------|--------|------------------|
| File name............... | ________ | Name of document to be printed |
| Type style for printing............... | 1 | 1=Prestige Elite(12pitch)<br>2=Courier(10 pitch)<br>3=Essay standart(proportional)<br>4=Essay Bold(proportional) |
| Left Margin........... | 6 | Number of spaces from the left of the paper (1 - 20) |
| Copies.................. | 1 | Number of copies (1 - 99) |
| Duplex................. | 1 | 1=Yes (Print both sides of paper)<br>2=No Print one side only) |

PRIOR ART

FIG. 8

METHOD AND APPARATUS FOR DISTRIBUTED PROCESSING OF DISPLAY PANEL INFORMATION

BACKGROUND OF THE INVENTION

The present invention relates to a method for distributing the processing required in servicing a plurality of keyboard/display terminals which are interactively coupled to a host data processor executing a host-based application program. More particularly, the invention relates to a method and apparatus for distributing from a host processor via a data stream, information which conveys not only physical display position information but also the logical parameters by which a keyboard/display terminal is controlled.

In the prior art, host-based applications programs have utilized application programming interface software for communicating with a user via a user input/output device such as a keyboard/display terminal. Early application programming interface software tended to be very "physical," insofar as the interface software defined the precise row and column locations of each item of information to be displayed on a screen. The interface software was frequently prepared as a package associated with a particular application program, tailored to the application program and to a particular user interface device. Very little standardization of user interface was developed, with a result that different application programs, or even different parts of a single application, could have very different user interface software. This lack of standardization necessarily led to user confusion, for it was necessary to not only educate the user concerning the operation of the applications program, but also to educate the user concerning the operation of the user interface. Furthermore, interface software which was perfectly usable with one particular keyboard/display terminal could become unusable if the keyboard/display terminal were replaced with a model of a different type; i.e., a display terminal having a different size screen.

More recently, application programming interface software has tended to become more standardized, leading to "logical" constructs at the application programming interface. This standardization led to the development of user interface rules which defined panel content and size, and definition of fields to be displayed within predefined panel areas. It became easier to develop application programming interface software by following these rules, and the software itself was able to enforce the rules by checking and formatting panel constructs according to the rules either at the time the application was compiled, or at the time display panel information was presented. However, the enforcement of user interface rules does lead to increased loading of the host processor, because the host processor is required to perform rule checking during the execution of applications software. For example, a host processor cannot determine how much data will fit onto a display screen until the display screen size is known, which typically occurs only at the time the applications software is actually executed in a systems environment.

Recent innovations in computer technology have focused on improving and facilitating the user/computer interface, and techniques have been developed for improving the flexibility of information presentation on CRT display screens which form a part of user terminals. The processing power required to support these new techniques has been designed into the host processor, in the form of hardware and software, to reduce the number of functions which the user must perform and to enhance the interaction between the user and the computer system. This processing power has necessarily increased the processing load imposed upon the host processor, which has resulted in increased memory size requirements and increased software, and to some extent has required additional design complexity of hardware circuits for facilitating the processing. All of these tasks have largely been accomplished within state-of-the-art design and development techniques, but have naturally resulted in increases in costs associated with the computer system. For example, the concept of "help text" in a window where the user is allowed to resize the window; resizing requires re-flow of the "help text," which is a significant burden to the host processor.

In a stand-alone computer system the increase in cost resulting from improving and enhancing the servicing of a keyboard/display terminal is easily justifiable, for the incremental cost increase is small as compared with the entire system cost. However, in computer systems designed to accommodate a great many keyboard/display terminals, the increase in cost can become quite appreciable, and can force the manufacturer to forego incorporation of many of the latest techniques into these terminals for that reason.

One important class of computer system utilizes a central host processor which is connected via communication lines to potentially a large number of external workstations, wherein each workstation incorporates a keyboard and display terminal. In order to lower overall system costs, these workstations have traditionally been designed with a minimum of hardware capability, usually containing only sufficient hardware capability to support the data displayed on the screen, and to receive and pass on signals generated by the user at the keyboard. In such systems, which have become known as "dependent workstations" (DWS), the processing required for creating the screen display and for updating the screen display is handled by the host processor, and the DWS processing is limited to receiving a data stream having a limited content—sufficient to define the physical location on the screen of display panel information. The DWS is also capable of detecting a keystroke signal from the keyboard and transferring this signal to the host processor for analysis and processing.

Since very little independent intelligence has been designed into prior art DWS devices, manufacturers have been able to develop fairly large computer systems requiring a great number of DWS devices, controllable by a single host processor, at relatively economical costs. In such systems, the host processor typically executes one or more forms of application programming interface (API) software when a panel is to be displayed, to format the panel, build a data stream that incorporates the data to physically describe the panel display, and transmit the data stream to a workstation control interface. In systems wherein DWS devices are utilized as workstations, the data transmission passes through an intermediary workstation controller (WSC) which is connected to a significant number of DWS devices, and is designed to serve all of the DWS devices to which it is connected. The WSC is the workstation control interface and actually provides the specific screen presentation and limited data entry verification for each DWS device, by building and transmitting a panel description as defined in the data stream received from the host processor, and transferring keyboard keystroke signals from the user to the host processor. It is noteworthy that the display functions handled in the prior art WSC-DWS interconnections are limited to the physical construct of specific display panels as defined by the host processor; the user interface functions permitted in the prior art WSC-DWS interconnection are limited to transferring an encoded signal to the host processor from the keyboard upon recognition of a function key signal (e.g. ENTER).

The prior art techniques for interfacing a host processor with a plurality of DWS devices, via a WSC, cannot handle some of the more recent innovations in advanced user interface constructs, such as selection fields, action bars, windows, and scrollable panel areas; prior art techniques also cannot define "invisible" panel data such as undisplayed scrollable items. Further, prior art techniques cannot support certain enhanced user interface functions, such as cursor movement control, real-time indicators such as selection and scrolling, selections by "mouse" devices, and graphical representation of information by means of icons.

The foregoing and other recent innovations in user interface functions cannot readily be accommodated by the prior art approach to interfacing a host processor with a plurality of DWS devices, because the increased processing load which each DWS device would inherently create would have to be handled by the host processor. This extra loading on the host processor takes away from its processing time required for other functions, and necessarily requires that some sort of priority time sharing scheme be adopted to enable the host processor to perform its normal work processing routines and also to service a plurality of DWS devices. When this approach has been tried, the practical result has been an intolerable delay in the perceived time that a user must wait during any user interaction function. At best, these time delays can amount to several seconds, which is not only annoying from the user's standpoint, but also seriously impedes the user's ability to accomplish his normal work functions.

There is therefore a need for a new technique and method for relieving the host processor from handling certain enhanced user interface constructs, and for relieving the host processor from the control loop relating to certain enhanced user interface functions. The present invention fills this need, by a novel distribution of the processing functions required for servicing user interface functions, including display panel constructs. The present invention reduces the load on the host processor, nor does it require a significant enhancement in the design capabilities of the DWS devices. The present invention enables the DWS devices to utilize a great many of the recent innovations in user interface without perceptively detracting from the speed and efficiency of operation and interaction between the host processor and the user.

In any typical prior art system utilizing a host processor and workstations, wherein the workstations are utilized for user interaction and access and the host processor is utilized for running applications programs, the host processor provides certain fundamental information. For example, the host processor may generate a data stream containing information to be displayed on a workstation screen, and information for controlling the presentation and position of the data on the screen. The data stream generally does not convey any logical intelligence, i.e. information to enable the workstation to independently control and manipulate subsequent screen display panels as a consequence of its interfacing with the user. The control and manipulation of each screen display panel is typically generated by the host processor, by transmitting a new data stream for each panel, wherein each data stream contains new presentation and position information. In the case of a programmable workstation (PWS), the host processor data stream is sent directly to the workstation and is processed internally in the workstation, which itself contains sufficient internal memory and program data to directly control the interaction with the display screen and keyboard. The PWS performs the workstation control interface function. In the case of the DWS, the host processor data stream is sent to a workstation controller (WSC), and the WSC controller provides the internal memory and control for directly controlling the display screen of the DWS. In either case, the host processor-constructed data stream is received by a workstation control interface (hardware and/or software), and the workstation control interface processes the data stream. The workstation control interface may poll the workstation to determine whether a keystroke should be recognized or whether any of a predetermined number of commands have been accepted.

Although a PWS terminal is of considerably more sophisticated design than a DWS terminal, when it is used in an environment where a host processor executes applications programs and merely utilizes the PWS terminal for operator/user interface, the PWS terminal suffers from most of the same limitations as a DWS terminal. For example, each time a display panel is changed on the screen of either type of terminal, the host processor creates the panel description, and presentation, and constructs a data stream for transmission to the terminal. A typical data stream transmission may include 2,000 bytes of information, more or less, and may require a transmission time of at least several seconds, in addition to the processing time required for creating and developing the data stream. In a system involving a considerable number of such terminals, the processing load and transmission time constraints are cumulative, leading to significant reduction in overall system performance. The present invention deals with a method for improving that performance with respect to both PWS terminals and DWS terminals. However, for convenience herein, reference will be made primarily to DWS terminals throughout, it being understood that the uses and advantages of the invention are equally applicable to both types of terminals. Where reference is made herein to workstation controllers (WSC), it should be understood that such controllers are associated with DWS terminals, and PWS terminals do not utilize workstation controllers. PWS terminals communicate directly with the host processor through suitable I/O communications controls, but PWS devices have internal logic which effectively performs performed by workstation controllers.

SUMMARY OF THE INVENTION

The present invention provides a method and apparatus for distributing display panel processing responsibilities between a host processor and a workstation control interface. The host processor display data manager software generates a high level data stream that defines display panel constructs and variables, and transmits the data stream to a workstation control interface. The workstation control interface software receives the data stream and formats the display panel for presentation, within the physical constraints permitted by the particular display panel characteristics and according to a set of user interface rules. This frequently involves complicated processing; off-loading this processing into the workstation control interface significantly reduces the burden on the host processor. The workstation control interface also performs some keystroke processing, as a result of signals received from the remote terminal keyboard, and determines whether a particular keystroke requires notification to the host processor for further and more particular processing of the keystroke function.

It is the principal object of the present invention to provide a method and apparatus for distributed processing of certain display panel functions, wherein the workstation control interface receives a high level data stream from a host processor, containing logical content concerning a display panel construct and its variables, and the workstation control interface prepares the physical panel construct therefrom, including display panel size and position, and the contents of the physical data to be displayed in the panel.

It is a feature of the present invention to enable the display data manager software within a host processor to be written so as to provide a consistent mechanism within the applications program interface for the definition of panel area data in all workstation environments.

It is another feature of the present invention to provide a storage area within the workstation control interface so as to enable the transmission of panel area data between the host processor and the workstation control interface in a logical representation rather than a physical representation; i.e., panel area data may be represented by logical descriptors rather than by assigned screen addresses.

It is an object of the present invention to provide a method and apparatus for local control of certain display panel functions, without reference to the host processor.

It is another object of the present invention to generate physical panel layouts at a workstation or a workstation controller from a generalized data stream from the host processor, wherein the host processor does not require specific information concerning the type and/or identity of the workstation.

It is another object of the present invention to distribute the processing load associated with the performance of display panel activities, so as to reduce response time and maximize the efficiency of the entire processing system and the user.

BRIEF DESCRIPTION OF THE DRAWINGS

The foregoing and other objects and advantages of the invention will become apparent from the following specification, and with reference to the claims and the appended drawings, in which:

DESCRIPTION OF THE PREFERRED EMBODIMENT

Programmable Workstation

Figure 1:
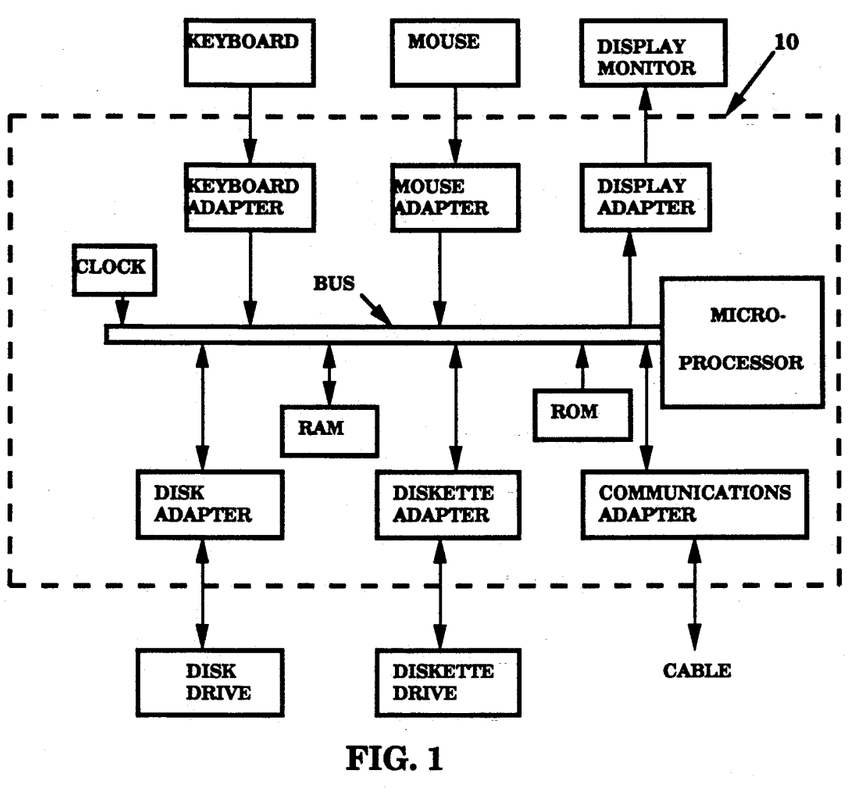
FIG. 1 shows a typical block diagram of a PWS.

Referring first to FIG. 1, there is shown a typical block diagram of a PWS; the circuits within the dotted outline 10 are generally found on one or more circuit boards within the PWS framework. The microprocessor is typically an Intel type 80286 or 80386, or equivalent microprocessors by other manufacturers. The microprocessor has an external bus which may communicate with a number of adapters which themselves are connectable to various internal and external devices.

The host processor communicates with the PWS via a communications line, identified as a "cable" in FIG. 1. A plurality of PWS devices may be connected to a host processor via such communications lines, wherein each PWS has an internal application program known as "Workstation Function," which enables the PWS to perform the tasks of a workstation control interface as hereinafter described. The host processor is not concerned with, nor does it require specific knowledge of, which of the several types of remote terminals it is communicating with. When the host processor determines that a display screen representation is to be transmitted to a remote terminal, it constructs a data stream having the content described above, which is known in the prior art as a "5250 data stream." The format of this data stream is identical for communications with a PWS and a WSC, for the Workstation Function software operating within the PWS enables the PWS to process the data stream in the same manner as a WSC controller would process the data stream. While the processing actions within a PWS differ from the processing actions within a WSC, the external interaction with a host processor is identical in both cases. Likewise, when the operator at a remote terminal makes a keystroke, the processing actions which pass to the host processor are identical in either case, although the internal processing within a PWS is different from the internal processing within a workstation controller.

The typical PWS will have a keyboard, and optionally a mouse, connected through adapters to the internal bus, a display monitor connected through an adapter to the internal bus, one or more disk or diskette adapters coupled to one or more disk or diskette drives and connected to the internal bus, and a communications adapter which is connectable to other systems via external cables. The RAM is typically a random access memory having 1–16 megabyte capacity, which is sufficiently large to store a complete operating system, an extensive work area for programmable calculations, a monitor screen buffer area and an area for executing application programs. The ROM is a read only memory which typically contains coding for initializing the machine, for performing diagnostic operations, and for controlling the basic I/O system; the ROM is typically 64–128 kilobytes in capacity. The PWS is therefore operable as a stand-alone computer system, or as an independent workstation which may be connected to a host computer via external cables. The capabilities of the PWS enable it to provide a wide variety of user enhancements, including a full range of cursor controls, instantaneous scrolling, and display screen modification. All of these enhancements are contained and controlled within the PWS itself, although when a PWS is connected to a host computer processor and is operated as a workstation, it receives its overall command and control from the applications software in the host processor. For example, the host processor may transmit a data stream embodying display screen content to the PWS, and may identify the formats by which the data is to be displayed and controlled, but once the PWS receives the broad directions from the host processor the PWS itself generates the internal control signals for regulating the actual data display on the display monitor. In the preferred embodiment, the PWS shown in FIG. 1 is an IBM Personal System/2 or equivalent, although another IBM personal computer, or equivalent design, could be used.

Dependent Workstation

Figure 2:
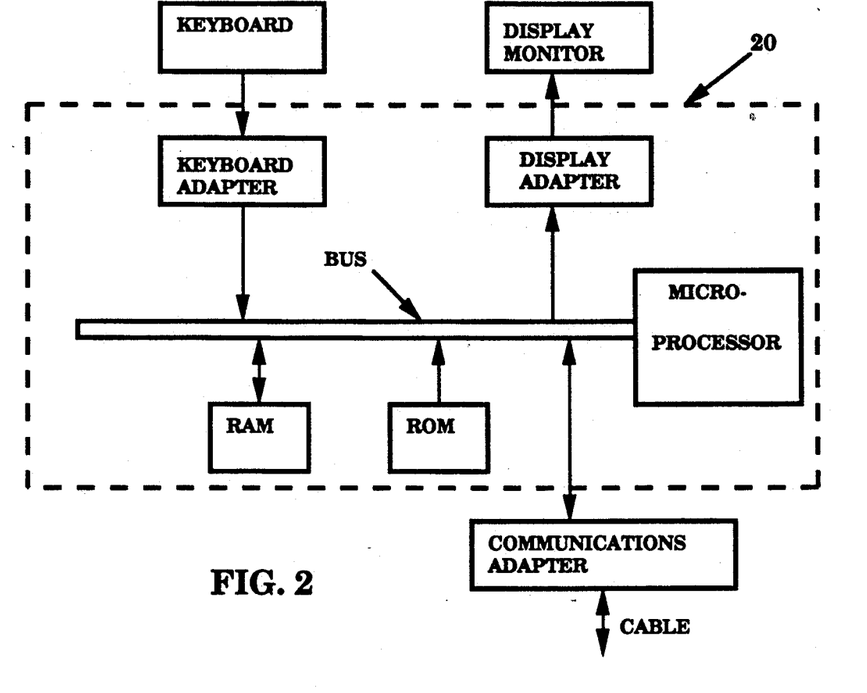
FIG. 2 shows a typical block diagram of a DWS.

FIG. 2 shows a typical block diagram of a DWS, wherein the circuits typically found within the framework are designated within dotted outline 20. The microprocessor is typically an Intel type 8088 or 8086 circuit device, or equivalent, and the microprocessor has an external bus which is connectable to several adapters for enabling communications with a limited number of external devices. For example, a keyboard adapter enables communications between the microprocessor and a keyboard, a display adapter enables information to be transferred to a display monitor, and a "communications" adapter enables communications to be made between the DWS and a workstation controller. The RAM is typically capable of 3–5 kilobytes of storage, for storing a screen buffer, and for providing a limited amount of memory work area for internal processing. The ROM is typically about 8 kilobytes in capacity, for storing coding relating to power-on processing, diagnostics, and character generation patterns and process communication protocols for communicating with other systems. The DWS is incapable of any significant internal processing beyond that which is required to interface with the keyboard and display monitor, and to communicate via the communications adapter. Therefore, all of the information displayed on the display monitor must be provided via the communications adapter to the RAM, and the microprocessor will generate sufficient internal control to display the information on the display monitor. Similarly, all keystrokes from the keyboard are temporarily received in the RAM, subject to activation of the communications adapter for transmission of the keystroke information over the cable to the WSC. In the preferred embodiment, the DWS shown in FIG. 2 is an IBM 5250 family display, although other equivalent types of DWS could be used. Workstation Controller In typical systems, the function of a "workstation controller" is to provide information transfer and control to a plurality of remote terminals from a single host processor. This workstation control interface function is usually performed by a hardware and software package which is uniquely identified and separate from the host processor hardware and software packages. The hardware for a workstation controller is typically contained on a circuit board package or packages which is pluggable into a host processor card slot, and the software for a workstation controller is typically executed by the hardware independently of software which is executed by the host processor. However, in certain systems, the workstation control interface function of a "workstation controller" is entirely a software package function, the software being executed within the host processor hardware. Although the preferred embodiment of the present invention is disclosed with respect to the workstation controller concept which is physically separate from the host processor in both hardware and software details, the invention is applicable to the second type of workstation controller, wherein the functions are performed entirely by a software package residing in a host processor.

If a workstation controller is physically remotely positioned from the host processor, its communications with the host processor are made via communication lines, connected in a manner similar to the connection of various other remotely located devices. If the workstation controller is physically incorporated into the host processor mainframe as a pluggable card, the workstation controller may communicate with the host processor utilizing the normal channel connections associated with the host processor.

Figure 3:
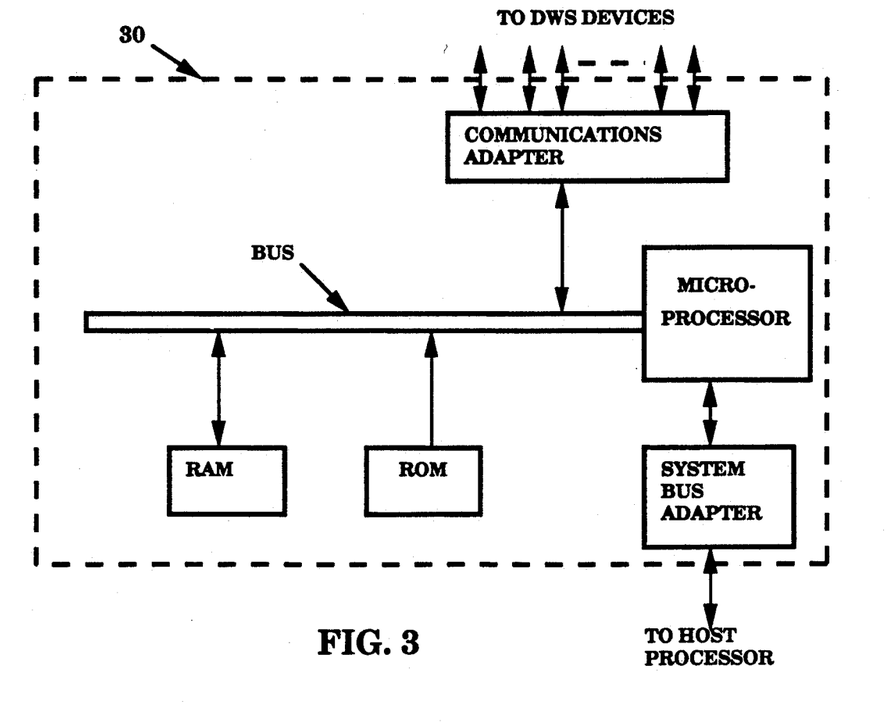
FIG. 3 shows a typical block diagram of a workstation controller.

FIG. 3 shows a typical block diagram of a workstation controller, of the type which typically communicates with a plurality of DWS devices. The workstation controller has a number of circuits contained within a package designated by dotted outline 30, and a microprocessor which is typically an Intel type 80826 circuit chip, or equivalent. The WSC microprocessor is typically connected to a system bus adapter which itself may communicate with a host computer processor. The WSC also has an internal data bus and a RAM having a capacity of 0.5–2 0 megabytes, and a ROM having a capacity of about 16 kilobytes, containing coding for initializing the WSC and for diagnostics relating to the WSC. The internal data bus of the WSC is connected to a communications adapter, which is externally connected to a "fan-out" multiplexer for enabling a plurality of DWS devices to communicate with a single WSC. In a typical application, the fan-out circuits are connectable to up to 40 DWS devices, and the screen display information for each of these DWS devices is stored within the WSC RAM memory. Likewise, keystroke signals from all of the DWS devices are received by the WSC and stored within the RAM, for subsequent communication to the host processor or for internal processing by the WSC. In the preferred embodiment the WSC of FIG. 3 is a "feature card" for an AS/400 computer system, wherein the microprocessor is suitably programmed.

Figure 4:
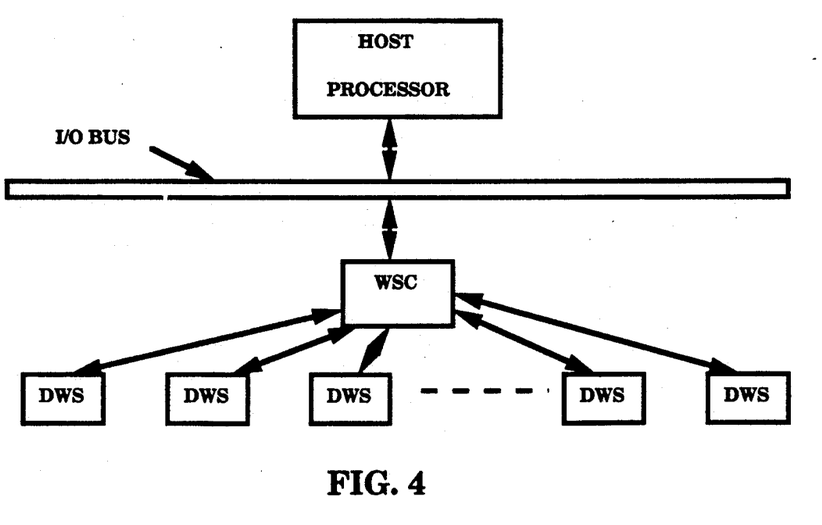
FIG. 4 shows a typical block diagram of a plurality of DWS devices connected to a host computer via a WSC controller.

FIG. 4 shows a typical block diagram of the system interconnections, wherein the host processor communicates with a WSC via an I/O bus, and a WSC communicates with up to 40 DWS devices via communications cables. Other devices and controllers may be connected to the I/O bus for communication with the host processor. In the preferred embodiment, the host processor is part of an AS/400 computer system.

Under typical operating conditions in the prior art, the host processor will construct a screen display for each of the terminals to which it is connected, the host processor will then transfer the data representative of each screen display to the WSC, where it is retained within a section of RAM identifiable with each particular DWS. The WSC then transfers the screen display data to each of the DWS devices, and each DWS device contains sufficient internal storage to retain the screen display data for purposes of presenting the display image to the user. If a DWS user makes a keystroke, the DWS indicates that the DWS has keystroke data available for transfer to the host processor. The WSC makes the transfer of this keystroke data when polling the DWS. The WSC retains in its internal memory and control information relating to all of the screen display images with which it is dealing. It transmits to and receives this information from the host processor upon command.

Figure 5:
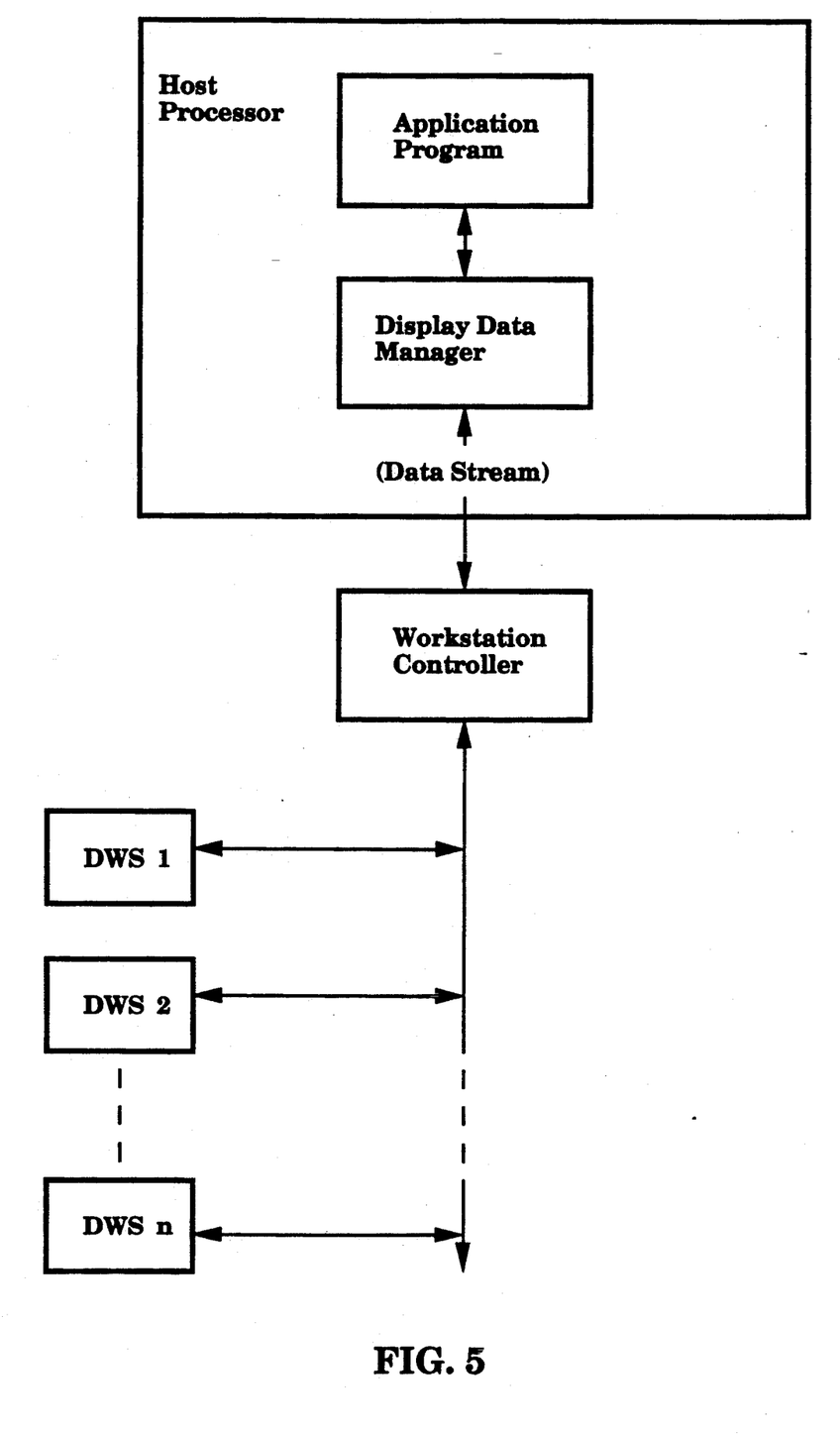
FIG. 5 shows a simplified diagram illustrating display data flow in a system having DWS terminals.

FIG. 5 shows a simplified diagram to illustrate the display data flow in a system having DWS terminals. The host processor executes application programs as a part of its normal operating function. These application programs communicate, from time to time, with the remote terminals connected in the system, either by processing keyboard data sent from the terminals or by generating display information to be transmitted to the terminals for display. When an applications program needs to communicate with a remote terminal it calls up an applications program interface routine, one form of which is identified as "Display Data Manager" (DDM). When information is to be displayed at a remote terminal, the Display Data Manager software constructs a data stream according to a particular format, and transmits this data stream to a workstation control interface. The workstation control interface software selectively interacts with all of the DWS devices, selectively activating the appropriate device and then passing the information to be displayed, which is contained in the data stream, to the selected DWS device.

Figure 6:
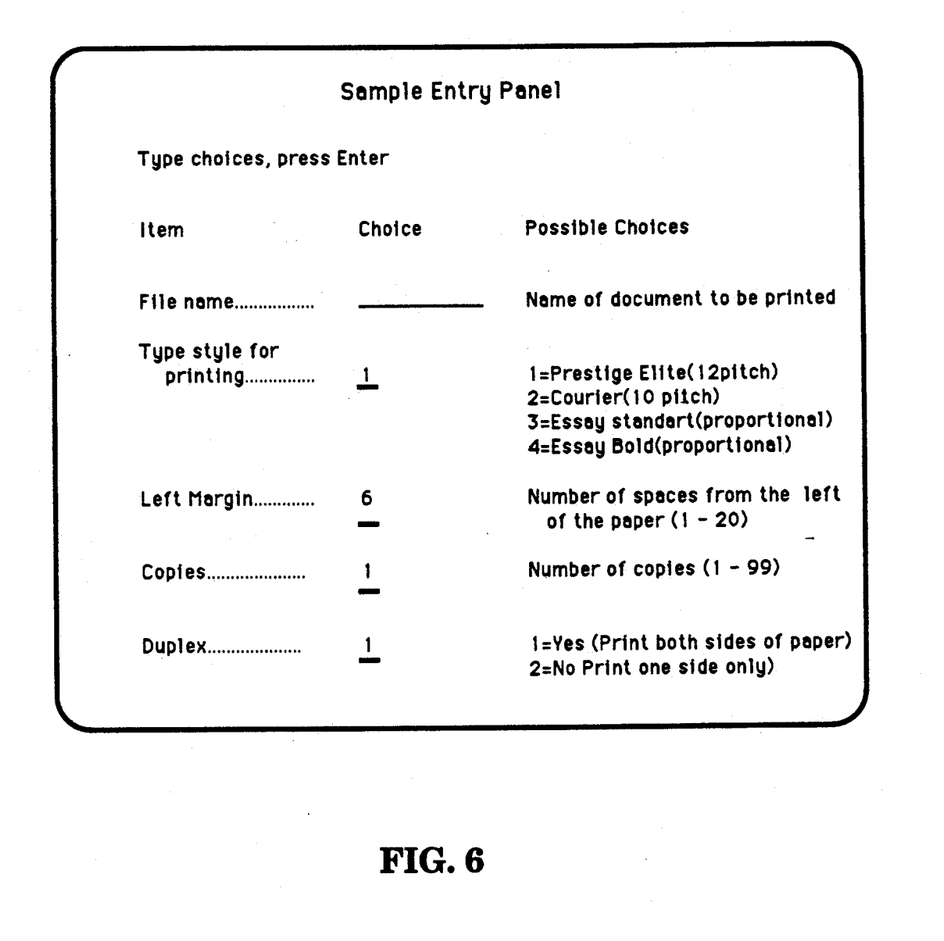
FIG. 6 shows an example of a panel construct.

By way of example, FIG. 6 shows a typical panel construct for a sample entry panel, in the form which is ultimately displayed on a remote terminal screen. For illustrative purposes, the definitions of variables and help text are not included in the example of FIG. 6. The sample entry panel contains an "Item" column which identifies a number of variables which may be selected by the operator. The panel also contains a "Choice" column for enabling the operator to select a particular choice for the "Item" column. The panel also contains a "Possible Choices" column, which explains the choices that are available to the operator. The panel may also display a function key definition (not shown) to assist the user.

According to prior art techniques, the Display Data Manager software which operates in the host processor interprets a source code panel definition as illustrated in Table 1 in order to initiate the display panel construct shown in FIG. 6.

TABLE 1

:panel name=entryl help=hentryl topsep=space ... Sample Entry Panel
:data depth='X' maxhead=2.
:topinst.Type choices, press Enter:
:datacol width=20.Item
:datacol width=10.Choice
:datacol width='X'.'Possible Choices'
:datai usage=inout help=hfname var=fname.File name
:datac.Name of document to be printed
:datai usage=inout help=hstyle var=prtstyle. Type style for printing
:datac.1=Prestige Elite (12 pitch)
:datac.2=Courier (10 pitch)
:datac.3=Essay Standard (proportional)
:datac.4-Essay Bold (proportional)
:datai usage=inout help=hmargn var=margin.Left margin
:datac.Number of spaces from the left edge fo the paper (1-20)
:datai usage=inout help=hcopy var=copies.Copies
:datac.Number of copies (1-99)
:datai usage=inout help=hduplx var=duplex.Duplex
:datac.1=Yes (Print both sides of paper)

TABLE 1-continued

:datac.2=No (Print one side only)
:edata.
:epanel.

The foregoing panel definition is formatted by the Display Data Manager software, according to a set of user interface rules, which assembles a data stream command sequence for transmission to the workstation control interface. The data stream command sequence for the display of FIG. 6 is described at Table 2.

TABLE 2

Clear display
Position at row 1, column 30
Write high intensity attribute+'Sample Entry Panel+normal intensity attribute
Position at row 3, column 1, write 'Type choices, press Enter:'
Position at row 5, column 1, write 'Item'
Position at row 5, column 24, write 'Choice'
Position at row 5, column 38, write 'Possible Choices'
Position at row 7, column 1, write 'File name ...'
Position at row 7, column 23
Define input field, 8 positions, underscored
Position at row 7, column 38, write 'Name of document to be printed'
Position at row 9, column 1, write 'Type style for'
Position at row 10, column 3, write 'printing ...'
Position at row 10, column 23
Define input field, 1 position, underscored, write '1' in field
Position at row 10, column 38, write '1=Prestige Elite (12 pitch)'
Position at row 11, column 38, write '2=Courier (10 pitch)'
Position at row 12, column 38, write '3=Essay Standard (proportional)'
Position at row 13, column 38, write '4=Essay Bold (proportional)'
Position at row 15, column 1, write 'Left Margin ...'
Position at row 15, column 23
Define input field, 2 positions, underscored, write '6' in field
Position at row 15, column 38, write 'Number of spaces from the left edge of'
Position at row 16, column 40, write 'the paper (1-20)'
Position at row 18, column 1, write 'Copies ...'
Position at row 18, column 23
Define input field, 2 positions, underscored, write '1' in field
Position at row 18, column 38, write 'Number of copies (1-99)'
Position at row 20, column 1, write 'Duplex ...'
Position at row 20, column 23
Define input field, 1 position, underscored, write '1' in field
Position at row 20, column 38, write '1=Yes (Print both sides of paper)'
Position at row 21, column 38, write '2=No (Print one side only)'
Place cursor at row 7, column 24
Unlock keyboard The command sequence listed in Table 2 constitutes a series of commands identifying the data to be displayed at particular physical position on the display screen; i.e.; the data stream defines the physical position of the display content for the display panel. Examples of this type of data stream are the 5250 data stream and the 3270 data stream. This data stream is received by the workstation control interface and is transmitted to the selected workstation for directly controlling the display presentation at the workstation.

Figure 7:
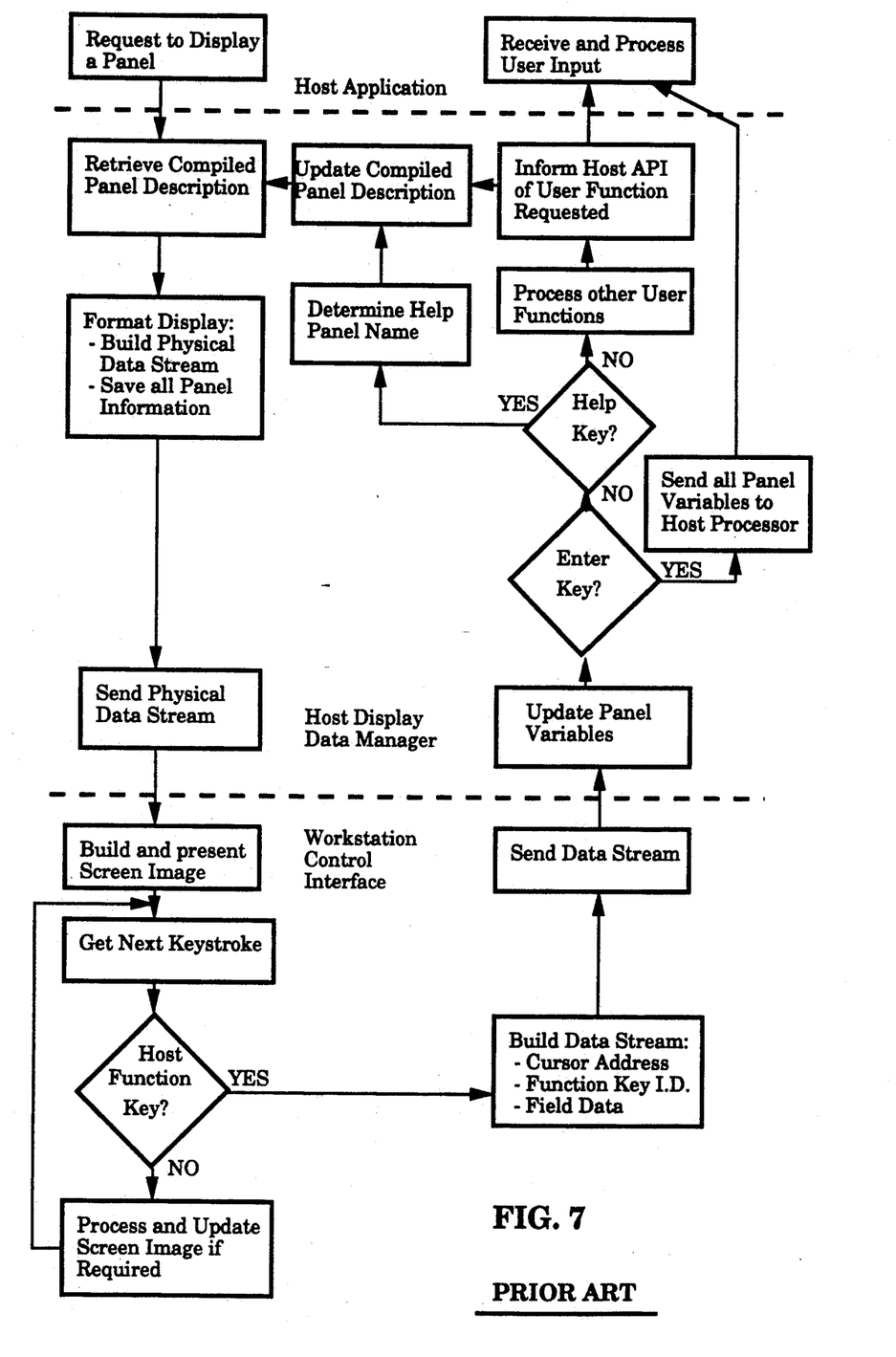
FIG. 7 shows a flow chart of the processing steps associated with the prior art techniques.

The processing steps associated with the foregoing prior art software execution are shown in FIG. 7. Referring to FIG. 7, the host-based applications software generates a request to display a panel at a particular and uniquely identified terminal, which may be either a PWS or one of the terminals connected to a WSC. The host-based Display Data Manager software (DDM) acknowledges the request, and retrieves the compiled panel description, such as is shown in Table 1 herein. The DDM software then formats the display, by constructing a physical data stream of the type represented in Table 2 herein, and the DDM software then transfers this physical data stream to the WSC (or PWS), i.e., the workstation control interface, for display. The DDM software also saves all panel information which it has constructed and transferred, for future reference in connection with keyboard inputs from the terminal. The workstation control interface receives the data stream and generates the signals to actually construct the screen image corresponding to the desired panel. The workstation control interface then becomes inactive until a keystroke signal has been received from the terminal; at the time the workstation control interface receives a keystroke it makes a determination whether the keystroke signal requires a host function or can be processed without interrupt to the host processor. Among the limited number of keystroke signals which may be internally processed by a WSC according to the prior art are the following:

a. cursor movement (up and down arrows, tab, new line)
b. data key (alphabetics, numerics)
c. field data editing keys (insert, delete, erase end-of-field).

If the WSC determines that the keystroke requires response by a host processor function, the workstation control interface constructs a data stream which, among other things, contains the current cursor address, the keystroke identification, and the entry field information associated with the panel. The workstation control interface sends this data stream to the host processor, where it is received by the DDM software. The DDM software updates its internal list of panel variables, and checks to see whether the keystroke is an "Enter" keystroke. The DDM will perform data validation if requested by the application program; for example, a numeric entry field could be defined having valid values 1-5. If the DDM detects an error the DDM may send an error message to the workstation control interface. If the data is valid, and on "Enter" keystroke the DDM software sends all panel variables to the host-based applications software which receives and processes the information. If the keystroke is not an "Enter" keystroke, the DDM software determines whether the keystroke is a "Help" keystroke. If it is not, the DDM software either processes the keystroke internally and as a result thereof constructs a new panel which is responsive to the keystroke, or signals the host-based applications software as to the keystroke function which is being requested. In either event, the DDM software will either update or present a new panel for display at the terminal, following the steps previously described. As a matter of practical implementation of the processing steps which are illustrated in FIG. 7, the host-based applications software is frequently called upon to become involved in at least a portion of the process steps required in servicing keystroke inputs from remote or other terminals. Likewise, the host-based applications software is required to play a role in constructing all new panel information for display, and the host-based DDM software is required to format all new or updated display panels, and to build a physical data stream for transmission to the workstation control interface in order that a new or updated panel may be displayed. The role of the workstation control interface is merely to receive the data stream and construct the actual screen image, and to pass keystroke signal information back to the host processor under nearly all operational conditions. The relatively few keystrokes which may be serviced wholly by action of the workstation control interface are representative of only a small part of the overall display and processing activities.

The present invention greatly improves the efficiency of processing by distributing to the workstation control interface a great number of the processing operations formerly required to be executed in the host processor. In its broadest context, the invention accomplishes this increase in efficiency by converting the data stream transmitted between the host processor in the workstation control interface from a merely "physical" data stream to a data stream having "logical" content; i.e., by relieving the host processor from the requirement of controlling and recording every physical character content display at the remote screen, imposing such duties upon the workstation control interface. This permits the host processor to become uninvolved with relatively minor physical panel content changes, and panel formatting according to a set of interface rules, but to remain involved with the more significant panel logical content changes. The invention enables the host processor to fully respond to all terminal keystrokes which require applications software response, and to be kept aware of all keystroke inputs which may be significant to the applications software, but to be uninvolved with physical panel content changes when such involvement is unnecessary.

The invention is implemented by changes to the DDM software and workstation control interface, the DDM constructs a logical data stream rather than a physical data stream in response to host-based applications software requests. As before, and with reference to FIG. 6, the DDM software which operates in the host processor may execute a source code program as illustrated in Table 1 in order to initiate the display panel construct shown in FIG. 6. The execution of this program by the DDM software causes the host processor Display Data Manager software to assemble a data stream command sequence for transmission to the workstation control interface, of the type shown in Table 3. Table 3 represents a "logical" data stream, as compared with the "physical" data stream illustrated in Table 2 with respect to the prior art.

TABLE 3

Define Window: help ID=0001, topsep=space
Title: text='Sample Entry Panel'
Define Data Area: depth='X', maxhead=2
Top Instruction: text='Type choices, press Enter:'
Data Column: width=20, text='Item'
Data Column: width=10, text='Choice'
Data Column: width='X', text='Possible Choices'
Download Data
Data Item: usage=inout, help ID=0002, var ID=0001, text='File Name'
Data Entry Choices: textl='Name of document to be printed'
Data Item: usage=inout, help ID=0003, var ID=0002, text='type style for printing'
Data Entry Choices: text='1=Prestige Elite (12 pitch)'
Data Entry Choices: text='2=Courier (10 pitch)'
Data Entry Choices: text='3=Essay Standard (proportional)'
Data Entry Choices: text='4=Essay Bold (proportional)'
Data Item: usage=inout, help ID=0004, var ID=0003, text='Left Margin'
Data Entry Choices: text='Number of spaces from the left edge of the paper (1-20)'
Data Item: usage=inout, help ID=0005, var ID=0004, text='Copies'
Data Entry Choices: text='Number of copies (1-99)'
Data Item: usage=inout, help ID=0006, var ID=0005, text='Duplex'
Data Entry Choices: text='1=Yes (Print both sides of paper)'

TABLE 3-continued

Data Entry Choices: text='2=No (Print one side only)'

The foregoing table shows a data stream which is encoded using structured fields, which are signified in Table 3 by not indenting the major structures, and indenting their associated minor structures with a preceding dash. In conjunction with the creation of the data stream represented by Table 3, the DDM software also creates a panel variable table as shown in Table 4, and a panel help table as shown in Table 5.

TABLE 4

| ID | Name | Type | Value |
| --- | --- | --- | --- |
| 0001 | fname | string | null |
| 0002 | prtstyle | numeric | 01 |
| 0003 | margin | numeric | 0006 |
| 0004 | copies | numeric | 0001 |
| 0005 | duplex | numeric | 01 |

TABLE 5

| ID | Name |
| --- | --- |
| 0001 | hentryl |
| 0002 | hfname |
| 0003 | hstyle |
| 0004 | hmargn |
| 0005 | hcopy |
| 0006 | hduplx |

Figure 8:
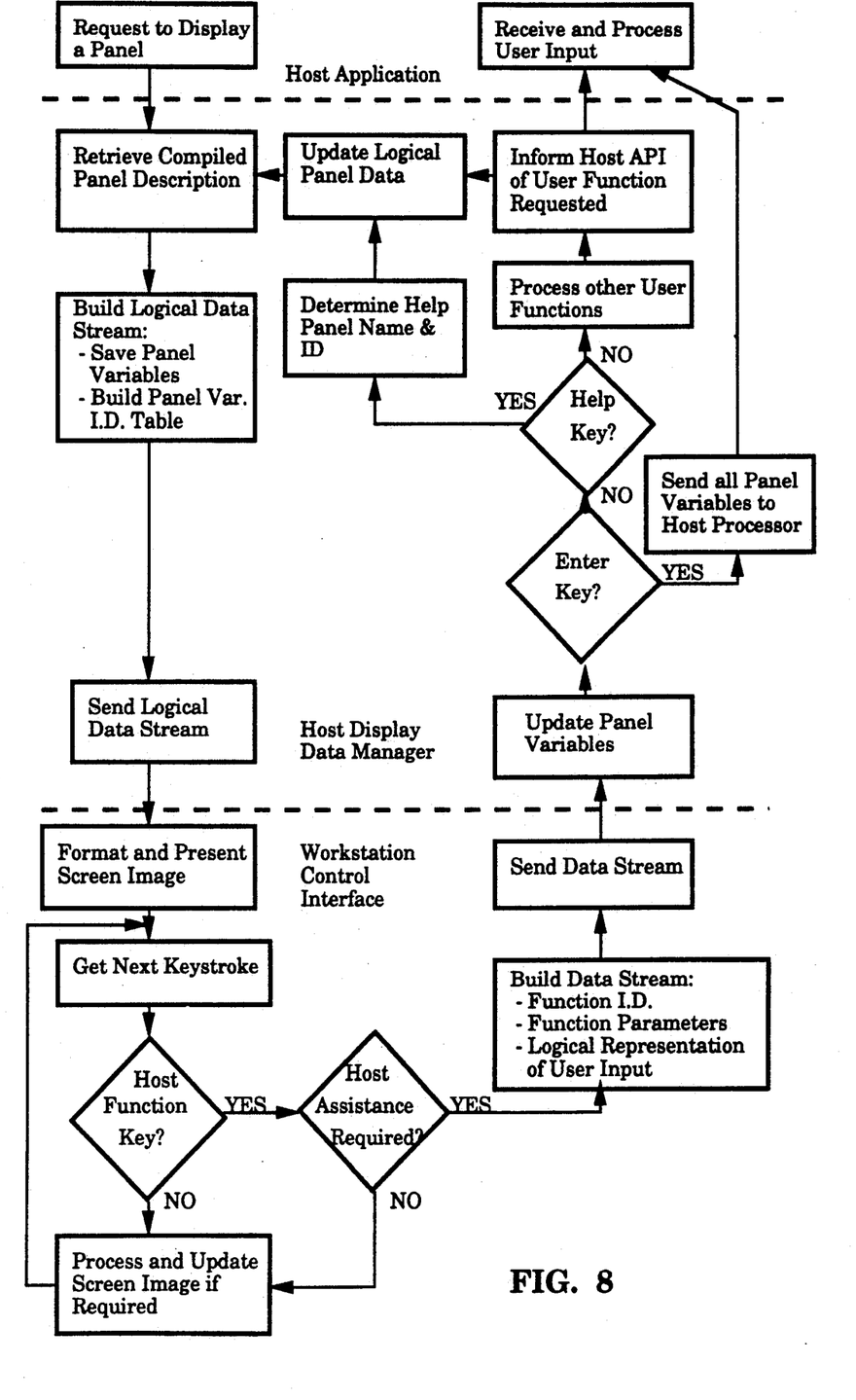
FIG. 8 shows a flow chart of the processing steps associated with the invention.

The processing associated with the construct of a logical data stream such as is shown in Tables 3-5 is illustrated with reference to FIG. 8. FIG. 8 is in many respects similar to FIG. 7, because the overall relationship between the host-based applications software, the host-based DDM software, and the workstation control interface software is quite similar. However, the utilization of the logical data stream concept greatly reduces the participation of the host-based software in the number of display panel updates and the processing required for each panel update. When the host-based applications software makes a request to display a panel, the DDM software compiles the information required for a panel description, such as is shown by example in Table 1. The DDM software constructs a logical data stream of the type shown in Table 3, saving and recording the panel variables identified in the data stream, such as is shown in Table 4 and Table 5. The DDM software sends the logical data stream for processing to the workstation control interface, which receives the data stream and formats it according to a set of user interface rules for presentation of a screen image. The panel construct information is saved and recorded within the workstation control interface, and the display is presented. When a keystroke signal is received by the workstation control interface, the internal software first determines whether the keystroke requires any participation of the host processor in order to be processed. This is analagous to the prior art determination of whether the keystroke is a host function keystroke, and if it is not the keystroke is processed internally as before. However, if the workstation control interface determines that the keystroke is a host function keystroke, it next determines whether the particular host function keystroke is one requiring assistance of the host processor. This step differs from the prior art, wherein all host function keystrokes were presumed to require assistance of the host processor. In the present invention, certain of the keystrokes can be processed locally (scrolling, print, area switching, window movement) because of the logical data stream information transferred initially from the host processor. The invention enables these keystrokes to be internally processed without further reference to the host processor. If the workstation control interface determines that assistance of the host processor is required, the workstation control interface constructs an inbound data stream which contains, among other things, the function identification and function parameters, and a logical representation of the user input embodied in the keystroke signal. This data stream is sent to the host processor, where it is processed by the DDM software as shown in FIG. 8.

The invention enables the workstation control interface to internally process a number of new keystroke signals and functions, which greatly enhance the overall efficiency and performance of a system containing a plurality of terminals. In the prior art, these user interface functions could not be supported by the host processor because of the time-consuming processing steps imposed upon the host processor. Each of these interface functions is described in the following paragraphs.

Cursor Movement Control

Certain cursor movement keys; i.e., "cursor up," "tab" may be processed locally by the workstation control interface. The host processor cannot handle these keys because the response time required for such an interaction is inordinately long, and particularly because the user needs an immediate response to a cursor movement keystroke. Cursor movement may be described logically; i.e., "move cursor to next cursorable position," or "move cursor to next cursorable item," versus a physical cursor movement description; i.e., "move cursor to next screen position in the direction of the arrow." In order to provide a data stream having logical parameters for cursor movement, the data stream must define to the workstation control interface certain information concerning which fields and items are cursorable. In the prior art, the data stream defined entry fields (location and size), but did not allow the definition of cursorable panel items (selection fields or action bar choices). By using a logical description of all panel constructs, the workstation control interface may control the movement of the cursor so that it moves logically instead of physically, thus greatly improving user productivity.

Real-Time Selection

In the prior art, since the data stream did not define selection fields or action bars, the workstation control interface could not assist in the selection of the choices within these panel constructs. Selection of a choice according to the prior art was performed by moving the text cursor to the desired choice and then depressing "Enter." This caused an interrupt to the host processor, and the host Display Data Manager software determined (via the returned cursor position) which choice was selected. However, since this technique requires an interrupt to the host processor, it is not a real-time selection. The present invention, by utilizing a logical description of selection fields and action bars, permits the workstation control interface to support real-time selection techniques (space,"/",numeric, mnemonic selection).

Real-Time Indicators

In the prior art, the data stream did not define selection fields or scrollable panel areas, and therefore selection or scrolling could not be performed on a real-time basis. In the case of scrolling, the host processor was required to perform all scrolling and updating of the scrolling indicators, and this inherently caused considerable delay. By distributing the scrolling responsibilities to the workstation control interface, real-time scrolling and scroll indicator management can be performed locally, greatly improving response time.

Real-Time Field Data Validation

In the prior art, the host-based applications software performs certain data validation functions, such as verifying that a number falls into a specific range, or that a valid textual parameter has been entered. The present invention enables the workstation control interface to perform these validation functions, because the data stream can define the validation parameters associated with each entry field. This gives the user immediate feedback after an entry error has been made, which improves the usability of the system.

Mouse Selections

The "mouse" selection device can be utilized to perform useful functions because the data stream of the present invention contains logical descriptions of panel constructs. Therefore, the workstation control interface can make a useful interpretation of what is to be done when a mouse is "clicked." Therefore, the mouse "click" can be used to perform meaningful tasks, such as selection and scrolling.

Graphical Representations of Information

The logical representation of the panel constructs (scrollable areas, function keys, etc.) enables graphics-capable devices to present information graphically rather than textually. For example, the logical representation can present scroll bars instead of up and down arrows, if desired.

Control of Function Key Definition Display

An area at the bottom of a panel may be reserved to display function key definitions. In the prior art a user keystroke would change the status of display or non-display; the DDM processed this keystroke and reformatted the panel. According to the present invention the workstation control interface can process this keystroke and reformat the panel.

Positioning and Movement of Windows

In the prior art the DDM determined window position and processed window movement or window resizing keystrokes. According to the present invention the workstation control interface can determine initial window position, based on user interface rules, and support movement and resizing of windows.

The foregoing invention may be implemented in any host processor-based system wherein the primary function of the host processor is in the execution of applications programs, and wherein a plurality of keyboard/display terminals are connected to the host processor via a workstation control interface. The distribution of processing contemplated by the invention significantly unloads the host processor, thereby improving the host processor execution of applications programs, and also improving the response time required for interacting with a plurality of users operating the plurality of keyboard/display terminals. The distribution of processing of keyboard signals to the workstation control interface enables a real-time interaction between the system and a plurality of users.

What is claimed is:

1. An apparatus for improving the communications efficiency between a host data processor and a plurality of remote workstations having keyboards and display screens, connected to the host processor via a workstation control interface, comprising:
    a) means, in said host processor, for constructing a data stream having logical information content describing content of display screen images but not position of said images on display screens;
    b) means for transmitting said data stream from said host processor to said workstation control interface;
    c) means, in said workstation control interface, for constructing a display screen image for any of said plurality of workstations responsive to data stream information received from said host processors; and
    d) means for transmitting said constructed display screen image from said workstation control interface to said remote workstations.

2. The apparatus of claim 1, further comprising means, in said workstation control interface, for receiving keyboard signals from said remote workstations; means for constructing display screen images in said workstation control interface responsive to said received keyboard signals; and means for transmitting said constructed display screen images to said workstation which originates said keyboard signals.

3. The apparatus of claim 2, further comprising means, in said workstation control interface, for constructing a data stream responsive to a received keyboard signal; and means for transmitting said constructed data stream to said host processor.

4. The apparatus of claim 2, wherein said workstation control interface further comprises means for identifying cursor movement keystroke signals, and means for constructing a display screen image having a repositioned cursor display responsive to said keystroke signals.

5. The apparatus of claim 4, further comprising means, in said workstation control interface, for constructing a display screen image having a scrolling indicator included therein.

6. The apparatus of claim 2, wherein said workstation control interface further comprises means for identifying selection field keystroke signals, and means for constructing a display screen image having displayed selection field choices responsive thereto.

7. The apparatus of claim 2, wherein said workstation control interface further comprises means for comparing received keystroke signals against predefined parameters associated with said signals, and means for constructing a display screen image responsive thereto.

8. The apparatus of claim 2, wherein said workstation control interface further comprises means for receiving signals from a mouse associated with any of the plurality of workstations, and means for constructing a display screen image responsive thereto.

9. The apparatus of claim 2, wherein said workstation control interface further comprises means for identifying window keystroke signals, and means for constructing a display screen image responsive thereto.

* * * * *